United States Patent
Bretschneider et al.

(10) Patent No.: US 8,082,765 B2
(45) Date of Patent: Dec. 27, 2011

(54) DEVICE FOR MAINTAINING A LOCKED AND CLOSED STATE OF A SPACE-SEPARATING DEVICE IN A RELEASABLE MANNER

(75) Inventors: Kai Bretschneider, Nürnberg (DE); Erik Bächle, Filderstadt (DE)

(73) Assignee: Euchner GmbH & Co. KG, Leinfelden-Echterdingen (DE)

( * ) Notice: Subject to any disclaimer, the term of this patent is extended or adjusted under 35 U.S.C. 154(b) by 260 days.

(21) Appl. No.: 12/311,521

(22) PCT Filed: Jan. 17, 2008

(86) PCT No.: PCT/EP2008/000311
§ 371 (c)(1),
(2), (4) Date: Apr. 2, 2009

(87) PCT Pub. No.: WO2008/110226
PCT Pub. Date: Sep. 18, 2008

(65) Prior Publication Data
US 2010/0038217 A1    Feb. 18, 2010

(30) Foreign Application Priority Data
Mar. 15, 2007   (DE) .................... 10 2007 013 480

(51) Int. Cl.
*E05B 65/08* (2006.01)
*E05B 15/02* (2006.01)
*E05C 1/16* (2006.01)
*H01H 27/06* (2006.01)

(52) U.S. Cl. ......... 70/95; 70/96; 70/98; 70/99; 292/144; 292/341.16; 292/341.17; 200/61.62; 200/61.64; 200/61.67; 200/61.68

(58) Field of Classification Search ................ 200/17 R, 200/43.01, 43.04, 43.07, 43.08, 43.16, 43.19, 200/50.12, 50.19, 61.62, 61.64, 61.67, 61.68, 200/318, 323, 324, 325, 334; 70/77, 78, 70/81, 91, 174, 183–186, 190, 192, 207, 70/209, 254–257, 465, 95–100; 292/254, 292/2, 56, 70, 80–83, 95, 121–124, 129, 292/96–101, 107, 137, 163–167, 169, 169.19, 292/177–182, 138, 139, 152, 153, 143, 144, 292/169.13, 341.16, 251.5, 239, 341.17; 340/545.1–545.7, 547
See application file for complete search history.

(56) References Cited

U.S. PATENT DOCUMENTS
3,892,933 A * 7/1975 Rocchitelli .................... 337/77
(Continued)

FOREIGN PATENT DOCUMENTS
DE    298 24 200 U1    9/2000
(Continued)

*Primary Examiner* — Michael Friedhofer
(74) *Attorney, Agent, or Firm* — Roylance, Abrams, Berdo & Goodman, L.L.P.

(57) ABSTRACT

A device (1) maintains a locked and closed state of a space separating device (2) in a releasable manner, in particular a protective device of a machine (4). The device has a first part (6) with an opening and a second part (8). The parts are movable relative to one another. The opening is at least partially closable. The device (1) includes a latch (18) for locking the closed state of the space-separating device (2), a holding element (30) for keeping the latch (18) in the latched position, and a release element (36) for releasing the catch of the latch (18). The catch of the latch (18) may be lifted by a rotational movement of the release element (36) relative to the latch (18).

20 Claims, 5 Drawing Sheets

U.S. PATENT DOCUMENTS

| | | | |
|---|---|---|---|
| 4,087,121 A | | 5/1978 | Davis |
| 4,283,718 A | * | 8/1981 | Butler et al. ............... 340/545.2 |
| 5,029,912 A | | 7/1991 | Gotanda |
| 6,318,138 B1 | * | 11/2001 | Mathews et al. ............. 70/278.7 |
| 6,539,760 B1 | * | 4/2003 | Letzel et al. .................... 70/276 |
| 6,554,326 B1 | * | 4/2003 | Goldman ...................... 292/144 |
| 7,503,600 B2 | * | 3/2009 | Hautala et al. ........... 292/341.17 |
| 7,562,918 B2 | * | 7/2009 | Toma et al. .............. 292/341.16 |
| 7,775,072 B2 | * | 8/2010 | Pullmann et al. ............... 70/208 |
| 7,798,538 B2 | * | 9/2010 | Powell et al. ................. 292/144 |

FOREIGN PATENT DOCUMENTS

| | | |
|---|---|---|
| DE | 10 2005 057 108 A1 | 5/2007 |
| EP | 1 795 676 A2 | 6/2007 |
| FR | 658 131 A | 5/1929 |
| GB | 27 873 A | 11/1913 |
| GB | 2 188 975 A | 10/1987 |

\* cited by examiner

DEVICE FOR MAINTAINING A LOCKED AND CLOSED STATE OF A SPACE-SEPARATING DEVICE IN A RELEASABLE MANNER

FIELD OF THE INVENTION

This invention relates to a device for maintaining a locked and closed state of a space-separating device in a releasable manner, in particular the protective device of a machine.

BACKGROUND OF THE INVENTION

In production engineering, for example, among other things, for safety reasons, machines and systems are set up within a space separated from the exterior and in which a person is not permitted to remain during operation of the machine. For example, to have access to the machine for maintenance work, the space-separating device generally has a closable opening. Generally speaking, operation of the machine should only be possible when the opening is closed, and the closed state is locked. Access to the machine is only possible when the locking of the closed state is neutralized.

DE 203 15 959 U1 discloses a device for monitoring the state of a space-separating device, in which it is ensured that a person located within the separated space is not able to close the space-separating device and lock it from the inside. Otherwise, there would be the risk that the machine could start inadvertently or intentionally while a person is located within the space-separating device.

DE 196 32 962 A1 discloses a door actuation device. From the interior of the space-separating device, a latch locking the closed state can be transferred into its unlocking position. The space-separating device can then be opened. Conversely, the latch cannot be transferred into its locking position, this movement possible only from the outside. In this way a type of "escape unlocking" is implemented.

DE 10 2005 057 108 A1, published at a later date, discloses a safety switch for producing a release signal depending on the position of a movable protective door. The part to be attached to the protective door has an actuator movable between a first position and a second position. The part to be attached to the frame has a recess engagable by the actuator in the second position. A blocking element can block the actuator in the second position.

DE 298 24 200 U1 discloses a device enabling an individual inadvertently locked within the protective enclosure to leave this protective enclosure. At the same time, the machines located within the protective enclosure can only be operated when the door on which the device is located is not only closed, but locked.

SUMMARY OF THE INVENTION

An object of this invention is to provide a device for maintaining a locked and closed state of a space-separating device in a releasable manner which overcomes the disadvantages of the prior art.

In one embodiment, the device is intended to enable not only locking of the closed state of the space-separating device, but to maintain the locked and closed state, for example, as long as the machine located within the space-separating device is in an operating state hazardous to people, for example, when the machine is running down after it has been turned off.

In one embodiment, in spite of maintaining the locked and closed state, the locking of the latch can be neutralized from within the space-separating device. The device is intended to ensure permanently reliable and safe operation.

This object is basically achieved by a device where the space-separating device can be protective hoods, protective doors, or an arrangement of partitions or separating gratings by which the inner region around a machine, such as a machine tool or an industrial robot, is separated from an outer region in which individuals can remain even during operation of the machine. The first part of the space-separating device can be designed, for example, as a frame part. A second part such as, for example, a door or window is movable. In the case of a door, conventionally the second part is pivotally coupled to the first part or is movably guided thereon.

The device has a latch for locking the closed state of the space-separating device. In one embodiment the latch is movably supported in the device and can be transferred from the retracted position into the locking position by an actuation element, such as a knob, to engage a latch receiver by blocking it and to lock the closed state. By the holding element, the latch can be blocked in its locking position. The locked and closed state of the protective device can then be blocked and maintained closed.

One or more sensors can detect the closed state of the protective device, locking of the closed state and/or maintaining the locked and closed state and can signal that status to a device controlling the machine. By this control, the machine can be started only when the space-separating device is closed, the closed state is locked and/or the locked and closed state is blocked. The blocking and/or the neutralization of the blocking can take place likewise in a signal-controlled manner. For example, the control can provide for the blocking of the latch to be neutralized only when the machine is in the safe state, for example, when a machine tool or an industrial robot is stopped, so that it cannot pose a danger to people. The blocking and/or release can be driven in a controlled manner for this purpose.

In one embodiment the holding element is spring-loaded and can, for example, engage the latch and block it as soon as the latch and holding element have sufficiently approached one another. The blocking can also be neutralized by a controllable drive, for example, by an electromagnet or a piezoelectric drive. Alternatively, the holding element can also be kept spring-loaded in a non-blocking position and can be transferred by a drive into the state blocking the latch in its locking position. In another alternative embodiment, the holding element can also have two stable states and can be switched back and forth between those two states by a drive.

The device moreover has a release element permitting neutralizing of the blocking of the latch. This release element can also be actuated from the inside of the space-separating device, optionally even against the action of a driving or spring force acting on the holding element. This arrangement ensures that a person located within the space-separating device is easily able, in particular without actuating an EMERGENCY OFF button, to neutralize the maintaining of the locked and closed state. Optionally, by neutralizing the blocking of the latch the device can produce a signal which signals to be machine control that the machine is to be transferred into the safe operating state, for example, is to be turned off.

The blocking of the latch can be neutralized by the rotary motion of the release element relative to the latch. In one embodiment the release element is located and pivotally supported on the latch for this purpose. Reliable neutralization of the blocking of the latch thus can be enabled with simple mechanical elements.

In one embodiment, following the rotary motion, the release element together with the latch can be moved. The locked and closed state of the space-separating device can then also be neutralized, whereupon the space-separating device can be opened. In one embodiment the actuating element located within the space-separating device dictates dynamic coupling in only one direction, specifically in the direction of neutralizing the locking position of the latch. Conversely in the other direction a trip-free mechanism prevents the position located within the space-separating device from being able to transfer the latch into its locking position.

In one embodiment the release element is a dual-arm lever which can be turned around an axis of rotation. The configuration as a dual-arm lever can implement different force and path ratios, for example, a relatively high torque for neutralizing the blocking of the latch can be made available with comparatively small actuating forces. Conversely, a correspondingly large lever arm can make available a comparatively large path, for example, for lifting the holding element out of a catch depression and thus for neutralizing the blocking of the latch. Moreover, the interval between delivering the force for neutralizing the blocking of the latch on the one hand and the position of the lever in contact with the holding element on the other hand can be chosen to be large. In this way the mechanical elements necessary for actuation can be located within the device such that the design is small. Alternatively or in addition, the actuating elements located on the inside and outside for neutralizing the blocking of the latch and the actuating elements provided for transferring the latch into its locking position can be located at a distance to one another. This spacing is especially advantageous for some applications.

In one embodiment the release element can be actuated by a knob. The initial rotary motion of the knob at the outset results in rotary motion of the release element with which the locking of the latch can be neutralized. As turning continues the latch moves linearly out of the locked position.

The release element can be turned, for example, by an element movably supported in the device and connected to the first knob by a coupling device. The coupling device in this case converts the rotary motion of the first knob by 90° into linear motion of the displacement element. For this purpose the coupling device can have first and second levers hinged to one another at an articulation point as a hinged joint. The first lever is nonrotatably connected to the first knob. The second lever is connected directly or indirectly to the displacement element by other elements. When the first lever is turned, the displacement element is moved. As a result first the blocking of the latch can be neutralized, and then the latch can be guided out of its locking position. In the reverse direction there is no motion coupling between the displacement element and the latch, in particular not with respect to linear motion.

In one embodiment the device has a second knob actuatable from the outside of the space-separating device, specifically located on the outside of the device. By the second knob, the latch can be moved into its position locking the closed state. In one embodiment the axes of rotation of the first and second knobs have an offset to one another. This offsetting has the advantage that each part of the space-separating device to which the device is attached need not be provided with a through hole for the common axis of rotation of the two knobs, as is necessary in the prior art. This metal-cutting at the installation site is disadvantageous for many reasons. On the other hand, the offset of the two axes of rotation ensures that in the closed state of the space-separating device there are no light gaps which are disadvantageous especially when within the space-separating device a laser machining device is present, and the emergence of laser light from the space-separating device must be reliably prevented.

In one embodiment the latch and/or the holding element are made such that they positively engage one another in the position blocking the latch. For example, the latch can have a recess with a catch flank in which the holding element catches in the position blocking the latch. The positive locking ensures that the resulting self-locking can implement a high holding force without correspondingly high drive forces having to be made available by a motor. This arrangement is especially advantageous because the release element optionally must overcome those forces activating the holding element.

In one embodiment, the device has a first sensor by which the position of the latch locking the closed state of the space-separating device can be signaled. The first sensor can be a safety switch as is conventionally used in safety engineering. In addition to contact safety switches in which a mechanically encoded actuator is introduced into the switch head and triggers a switching process there, non-contact or electronic safety switches can also be used which wirelessly transmit signals between an actuator and a read head. In one embodiment an actuator is in the form of a transponder on the latch. In the position locking the closed state of the space-separating device, the actuator moves into the response region of a read head so that only in the position of the latch locking the closed state of the space-separating device is signal transmission between the read head and the transponder possible. In one embodiment the transponder is located near the jacket surface of the latch, and the read head is located near or on the wall of the latch receiver. Alternatively, the actuator can also be located on or near the face-side end of the latch.

In one embodiment the device has a second sensor for signaling the position of the holding element blocking the latch. This second sensor can also be made generally as a non-contact safety switch. The holding element could be made specifically as a coupling element, for example, for signal coupling between the transponder located on the latch and the read head. Fundamentally, the first sensor and the second sensor can be made separately. Alternatively, the holding element can couple the transponder of the first sensor to a second read head of the second sensor so that there would be only one transponder on the latch. In this case it would also be possible to separately detect whether the latch is in its blocking position and whether the locked position is blocked by the holding element. In another alternative, signal coupling between the transponder and read head of the first sensor could only be possible when the holding element is in its position blocking the latch.

In one embodiment, the second sensor is an optical or magnetic sensor, such as a photoelectric barrier or a Hall sensor. Those sensors can be easily configured in a small design and optionally also directly on a circuit board. The holding element can be made as a pivotable lever, with a catch projection located at a distance from the axis of rotation for interaction with the lock.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

Figure 1:
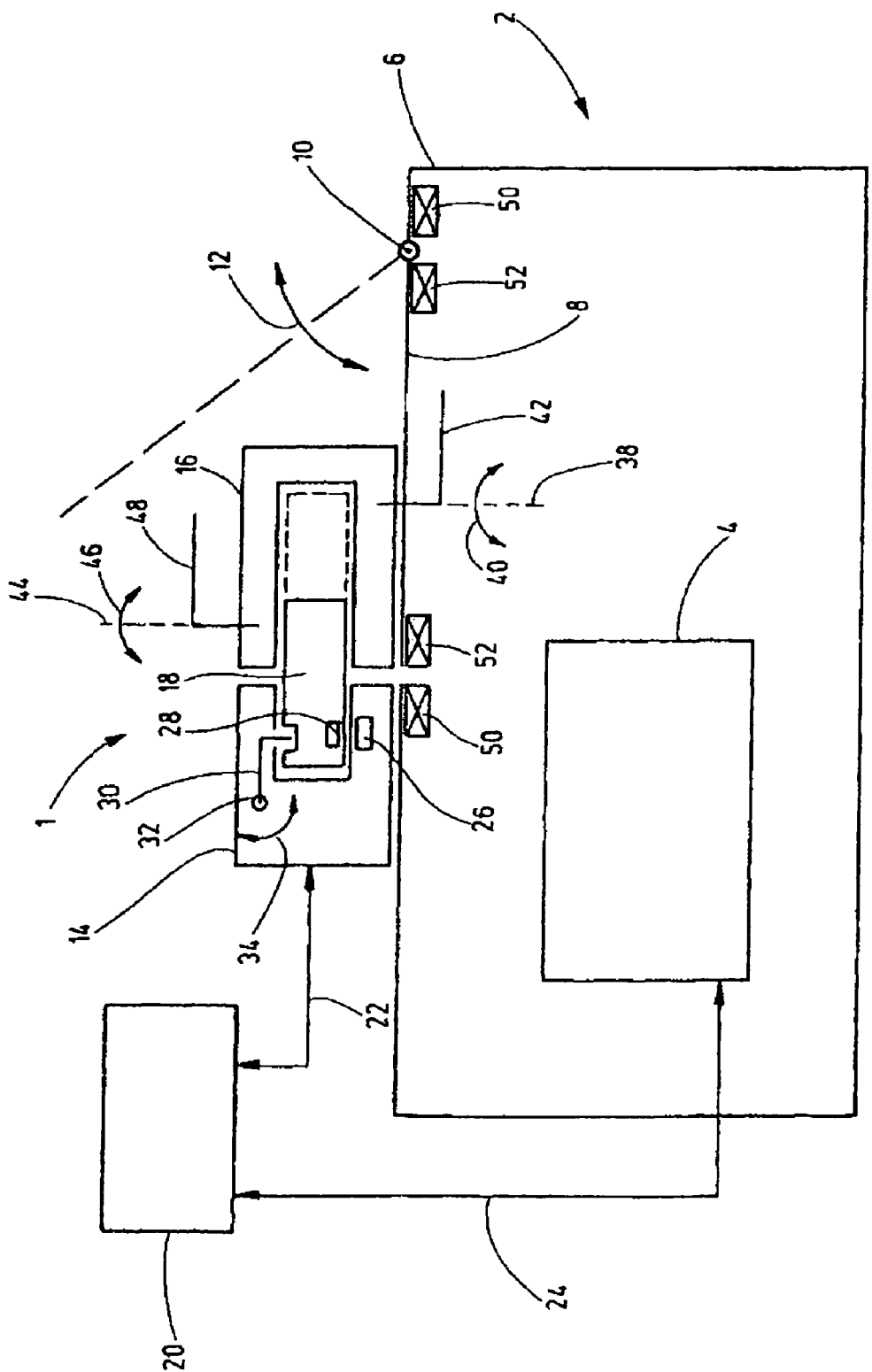
FIG. 1 is a schematic top plan view of a device according to an exemplary embodiment of the invention in the locked and blocked condition.

FIG. 1 shows a schematic top view of one exemplary embodiment of the device 1 according to the invention for maintaining the locked and closed state of the space-separating device 2, in particular the protective device of a machine 4, in a releasable manner. A first stationary part 6 has an opening closable by a second part 8. The first and second parts 6, 8 can be moved relative to one another allowing the opening to be at least partially closed. In the illustrated embodiment the second part 8 is a door pivotable around the first axis 10 according to the first arrow 12. The open state of the door is shown by the broken lines. A person can enter the interior of the space-separating device 2 through the opening and can, for example, equip, maintain, or repair the machine 4. During operation of the machine 4, a person is not permitted or is not to remain within the space-separating device 2.

For this purpose the device 1 has a first component 14 located on the first part 6 and a second component 16 located on the second part 8. The first component 14 has a receiver for a latch 18 movably supported in the second component 16. The closed state of the space-separating device 2 shown in solid lines can be locked by latch 18 so that the space-separating device 2 cannot be opened in this state.

The locked state can be signaled by a safety switch by way of a first connecting line 22 on a control device 20 which controls the machine 4 according to the filed control program by way of a second connecting line 24. Conversely, the machine 4, by way of the second connecting line 24, delivers feedback about the operating state to the control device 20. The control device 20 can control the device 1, for example, with respect to maintaining the locked state. The safety switch in the embodiment has a read head 26 located on the first component 14 and an actuator 28 located on the latch 18. Signal exchange between the read head 26 and actuator 28 is possible only in the illustrated locked state.

The device 1 moreover has a holding element 30 located in the first component 14 in the embodiment. Holding element 30 can be pivoted around a second axis 32 according to the arrow 34. The latch 18 can be blocked in the illustrated locking position by the holding element 30. The holding element 30 and the latch 18 are positively engaged. In the embodiment, the holding element 30 for this purpose engages a recess in the latch 18. The recess has a catch flank providing self-locking relative to the reset motion of the latch 18.

By a release element 36 (FIG. 2), the blocking of the latch 18 can be neutralized. Specifically, the holding element 30 can be lifted out of its position shown in FIG. 1. The blocking is neutralized by a first actuating element actuatable from the interior of the space-separating device 2 and formed by a first knob 42 rotatable around a third axis 38 according to the third arrow 40 (FIG. 1). Following the neutralization of the blocking of the latch 18, as the first knob continues to turn, the latch is retracted into the second component 16 so that the locking of the closed state is also neutralized and the second part 8 can be opened.

In one embodiment, the holding element 30 can be manually disengaged from the latch 18 only in this way. Specifically, the holding element 30 cannot be disengaged by the second actuating element accessible from the outside of the space-separating device 2 formed by a second knob 48 around the fourth axis 44 according to the fourth arrow 46 (FIG. 1). With the second knob 48 the second part 8 can be closed, and by turning the second knob 48 the latch 18 can be extended into the illustrated locking position.

The space-separating device 2 in the embodiment is a protective cab or a protective grating having flat elements attached to profiled rails 50, 52 extending perpendicular to the plane of the drawing of FIG. 1. The components 14, 16 of the device 1 can also be attached to these rails. As is apparent from the schematic of FIG. 1, the third axis 38 of the first knob 42 and the fourth axis 44 of the second knob 48 extend parallel to one another and are laterally offset relative to one another so that it is not necessary to drill through the profile rails 52 into the interior of the space-separating device 2 for passage of the fourth axis 44.

Figure 2:
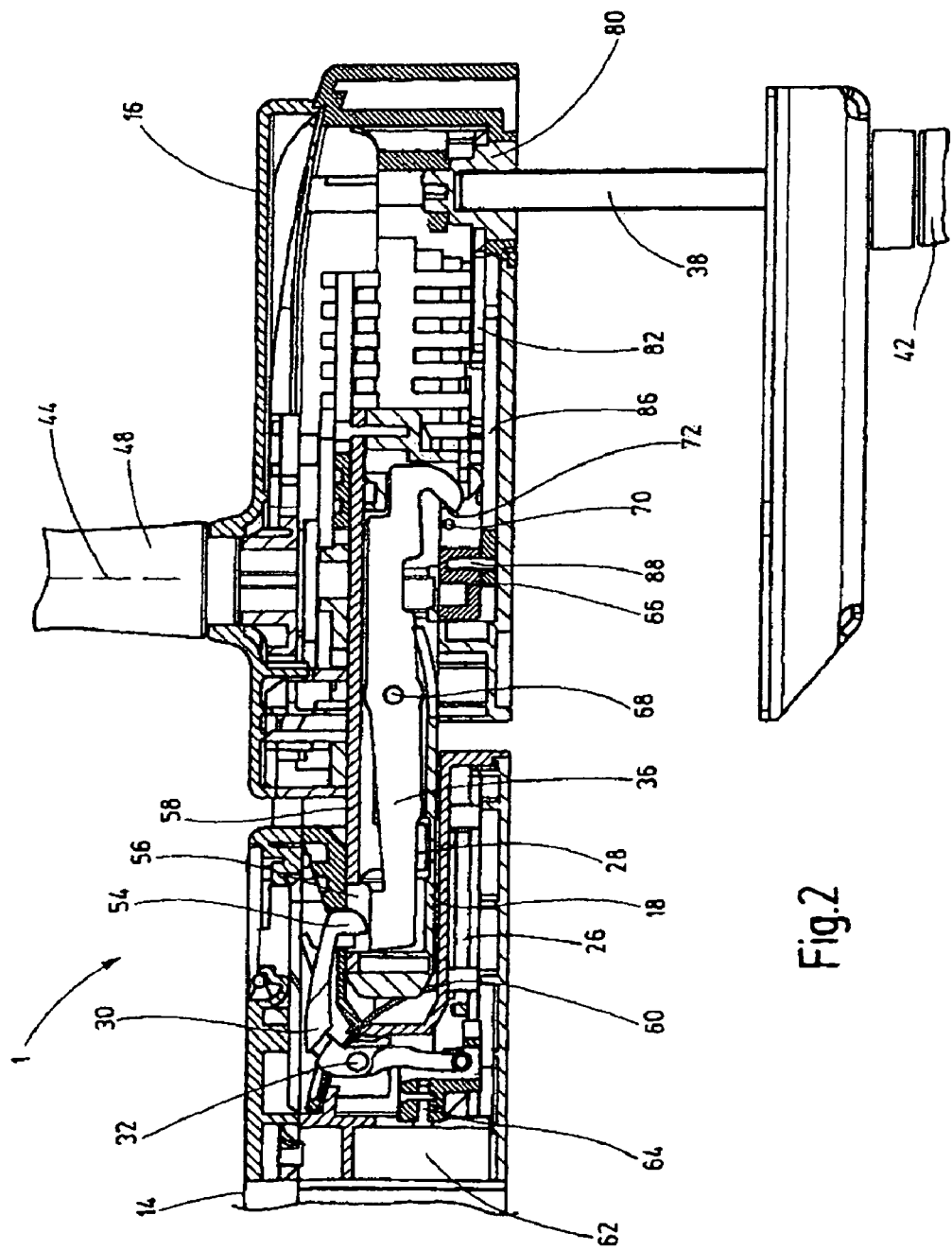
FIG. 2 is an enlarged top plan view in section of the device of FIG. 1 in the locked and blocked condition.

FIG. 2 shows a cutaway view of the embodiment of the device 1 which has been enlarged compared to FIG. 1. The first component 14 is connected to the first profile rails 50 and thus to the first part 6 (FIG. 1) by connecting means (not shown). Within the first component 14 the holding element 30 is mounted to be able to pivot around the second axis 32 extending perpendicular to the plane of FIG. 1 and in the illustrated maintained locked state. A projection 54 on the end side of holding element 30 engages a recess 56 of the latch 18.

The essentially cylindrical latch 18 in cross section can be shaped to be circular or essentially rectangular is formed of a plastic base part, with a metal insert part 58. Specifically, the insert part 58 is a metal sheet bent into a U-shape in cross section. The insert part 58 forms the recess 56 and is used in particular to accommodate the blocking forces. In a part inserted into the latch receiver 60 in the illustrated locked and blocked state, near the jacket surface on the latch 18 an actuator 28 is made as a transponder and can be read out from the read head 26 only in the illustrated position so that the locked and closed state of the space-separating device 2 can be signaled.

The projection 54 of the holding element 30 and the recess 56 in the insert part 58 each form a surface essentially parallel to one another and enclose a right angle with the direction of motion of the latch 18 for unlocking. In an attempt to retract the latch 18 by turning the second knob 48 around the fourth axis 44, this action results in positive locking between the latch 18 and the holding element 30 by which very high holding forces can be applied. The control device 20 or, for example, a manual EMERGENCY OFF can route the holding element 30 out of its holding position, for example, by an electromagnet 62 located in the first component 14 being energized. The magnet armature 64 then comes into contact with the arm of holding element 30 opposite the projection 54 relative to the second axis 32, with the holding element 30 turning counterclockwise in FIG. 2.

Regardless of such controlled neutralization of holding or blocking, turning the first knob 42 around the third axis 38 moves a displacement element 66 within the second component 16. A release element 36 is then turned clockwise around a fifth axis 68 extending perpendicular to the plane of FIG. 2. In this way, a release element section assigned to the holding element 30 comes into contact with the holding element 30 and lifts it in the course of rotary motion out of the recess 56 to neutralize holding or blocking. Conversion of the rotary motion of the first knob 42 into linear motion of the displacement element 66 takes place by a coupling device having first and second levers 82, 86 and shown in a side view in FIG. 5. Coupling of the motion between the second knob 48 and the latch 18 can take place in a similar manner.

When the first knob 42 is turning, the displacement element 66 and a pin 70 located thereon are moved to the right in FIG. 2. The pin 70 then comes into contact with the oblique surface 72 and the linear motion of the pin 70 is converted into rotary motion of the release element 36 by interaction of the pin 70 with the oblique surface 72 of release element 36. The release element 36 is made as a lever having two arms relative to the fifth axis 68. The action surface of the displacement element 66 lies on the side opposite the contact surface for the holding element projection 54 relative to the fifth axis 68. The axis pin for supporting the release element 36 is formed by the latch 18 or is fixed on it.

Figure 3:
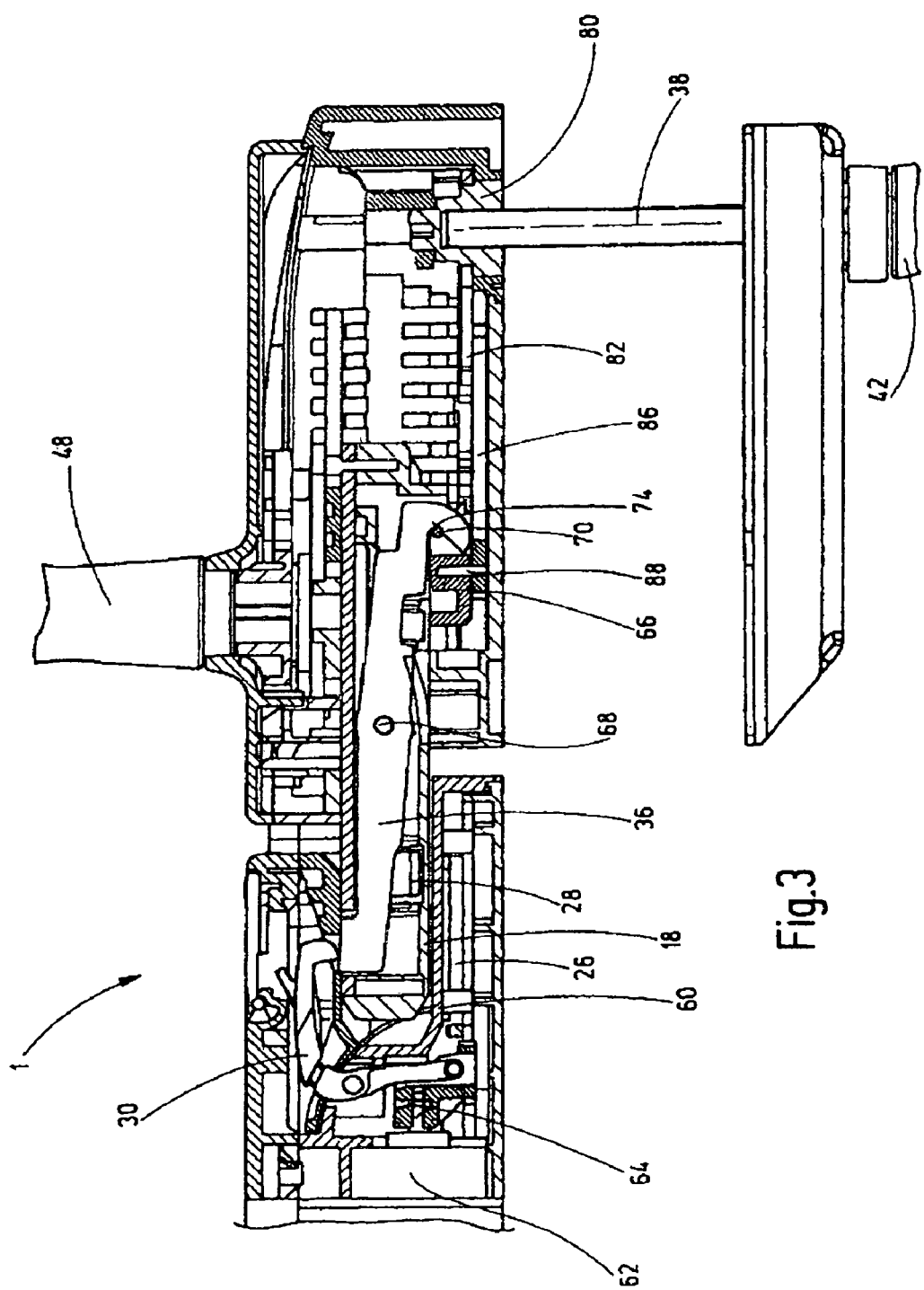
FIG. 3 is an enlarged top plan view in section of the device of FIG. 1 in the locked and unblocked condition.

FIG. 3 shows a cross-sectional view of the embodiment of device 1 corresponding to FIG. 2, but in the state in which the first knob 42 is turned around the third axis 38 so far that the pin 70 is moved completely along the oblique surface 72 and is held in a sector-shaped receiver 74 of the release element 36. In this state the release element 36 is turned maximally around the fifth axis 68. The holding element 30 is lifted completely out of the recess 56 so that holding or blocking is neutralized. As the first knob 42 continues to turn, as the displacement element 66 continues to move, the pin 70 entrains the release element 36. By way of the release element's support on the fifth axis 68 and the latch 18, and the pin 70 moves latch 18 in FIG. 3 to the right so that the latch 18 emerges completely from the latch receiver 60. Accordingly, the locking is also neutralized.

If the holding element 30, for example, is monitored in its position by a photoelectric barrier or a Hall sensor, the state shown in FIG. 3 can be signaled such that there is no longer any holding or blocking. At the same time it can also be signaled by the actuator 28 and the read head 26 that the space-separating device 2 is still in a closed and locked state.

Figure 4:
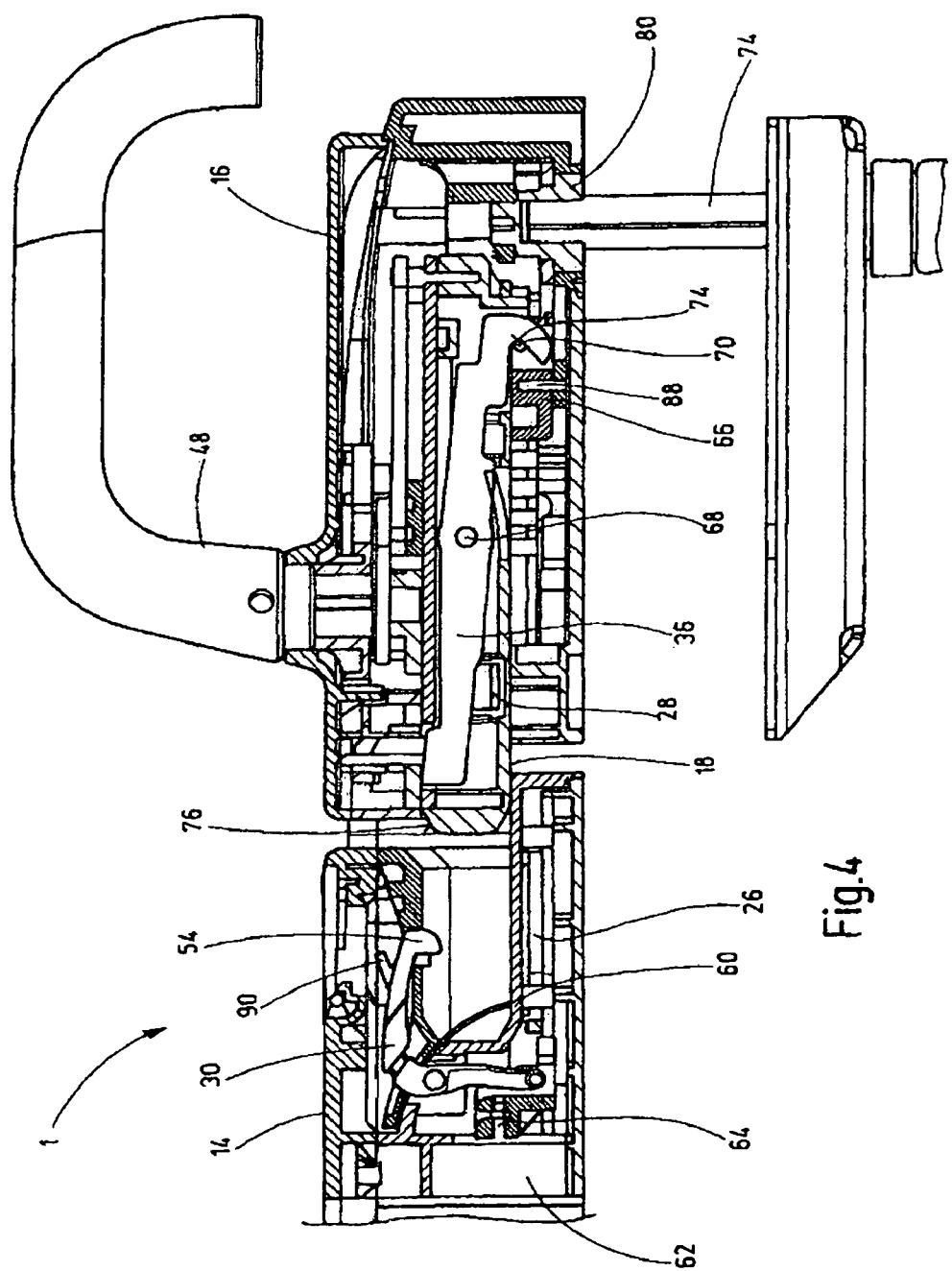
FIG. 4 is an enlarged top plan view in section of the device of FIG. 1 in the unlocked condition.

FIG. 4 shows an enlargement comparable to FIGS. 2 and 3, but in the state of the device 1 in which the latch 18 is retracted almost completely into the second component 16 by complete turning of the first knob 42. The displacement element 66 is located like the latch 18 on its rear stop. Continued turning of the first knob 42 in the direction of rotation leading to neutralization of blocking is no longer possible.

Based on the existing motion coupling, on the outside of the space-separating device 2 the second knob 48 is now in its end position which is opposite relative to FIG. 2 and has been turned back in particular by turning the first knob 42. In the illustrated state the second part 8 (FIG. 1) can be opened relative to the first part 6. The actuator 28 is no longer located in the read region of the read head 26 so that the unlocked state can be signaled. If it is necessary or advantageous that the closed state of the second part 8 still is to be signaled, an additional safety switch can be located, for example, on the facing end sides of the first and second part 6, 8 and, independently of the locking position of the latch 18, signals the closed position of the second part 8.

For relocking from the position shown in FIG. 4 the latch 18 must again be introduced into the latch receiver 60. This is not possible by turning the first knob 42 because the displacement element 66 in FIG. 4 is indeed moved to the left, but there is no respective motion coupling with the latch 18. This arrangement reliably prevents a person located on the inside of the space-separating device 2 from moving the latch 18 into its position locking the closed state. Rather, for this purpose the second knob 48 must be turned to move the latch 18 out of the second component 16.

On or near its face-side end, the latch has a bevel 76. With the bevel 76, the latch 18 can lift the holding element 30 out of its position shown in FIG. 4, in which the holding element 30 with its projection 54 projects over the recess 56 into the latch receiver 60. When the latch 18 has been fully inserted into the latch receiver 60, the projection 54 in turn engages the recess 56 and blocks the latch 18 in its locking position. In this motion of the latch 18, based on the motion coupling between the release element 36 and the displacement element 66, especially due to the contact of the sector-shaped receiver 74 with the pin 70, the first knob 42 undergoes a reset motion until it again assumes the initial position shown in FIG. 2.

Preferably, the holding element 30 integrally forms an action surface 90 which is accessible from the outside of the device 1. In any case after removing a cover, holding or blocking can be manually neutralized, preferably with a suitable tool.

Figure 5:
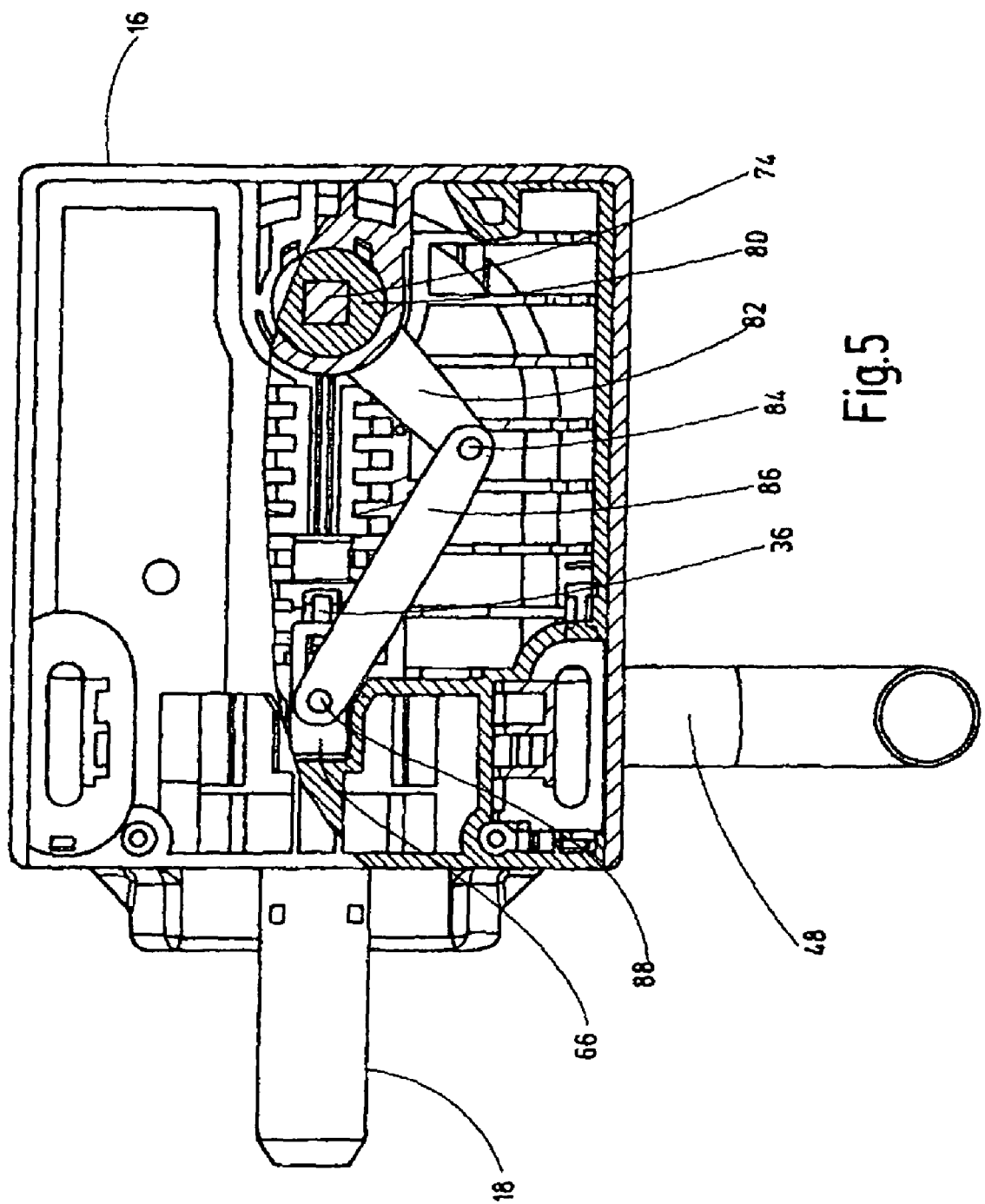
FIG. 5 is a side elevational view in section of the device of FIG. 1 in the locked condition.

FIG. 5 shows a side view of the device 1 offset by 90° relative to FIGS. 2 to 4, in particular of the component 16 from the direction of the position of the first knob 42. A coupling device is shown for converting the rotary motion of the first knob 42 into linear motion of the displacement element 66. FIG. 5 corresponds to the position of the latch 18 in FIG. 2. A square 78 turnable by a first knob 42 is nonrotatably connected by its shape to a driver shaft 80. Shaft 80 in turn is nonrotatably connected to the first lever 82. At the articulation point 84 formed, for example, by a pin, the first lever 82 is connected to the second lever 86, which is in turn connected to the displacement element 66 at a position spaced apart from the articulation point 84. Second lever 86 is articulated in particular at another articulation point 88 on the displacement element 66. In this way, as the first knob 42 turns around the third axis 38 which runs perpendicular to the plane of the drawing of FIG. 5, the displacement element 66 is moved back and forth, there being motion coupling with the release element 36 only in one direction.

While one embodiment has been chosen to illustrate the invention, it will be understood by those skilled in the art that various changes and modifications can be made therein without departing from the scope of the invention as defined in the appended claims.

What is claimed is:

1. A device for releasably maintaining a locked and closed state of a space-separating device, comprising:
    a latch movable between locked and unlocked positions for releasably locking the space-separating device in a closed state;
    a holding element releasably coupled to said latch and movable between a blocking position blocking said latch in the locked position thereof and an unblocking position allowing said latch to move from the locked position thereof to the unlocked position thereof;
    a release element neutralizing blocking of said latch and being pivotable relative to said latch;
    a displacement element coupled to said release element and movable between positions causing pivoting of said release element; and
    a first knob connected to said displacement element by a coupling device to cause actuation of said release element, said coupling device having a first lever hinged to a second lever at an articulation point, said first lever being nonrotatably connected to said first knob, said second lever being connected to said displacement element at a position spaced from said articulation point.

2. A device according to claim 1 wherein the space-separating device is a protective device of a machine having a first part with an opening and a second part being movable relative to said first part for opening and at least partially closing said opening with said protective device.

3. A device according to claim 1 wherein said release element comprises a dual-arm lever pivotable about an axis.

4. A device according to claim 3 wherein said dual-arm lever comprises a first arm neutralizing blocking of said latch during rotation of said dual-arm lever and a second arm receiving force causing pivoting of said dual-arm lever.

5. A device according to claim 1 wherein a motion coupling between said displacement element and said release element only allows movement of said displacement element in a direction neutralizing blocking of said latch.

6. A device according to claim 1 wherein said coupling device converts rotary motion of said first knob into linear motion of said displacement element.

7. A device according to claim 1 wherein a second knob is coupled to said latch to move said latch into the locked position, said first and second knobs being rotatable about axes offset relative to one another.

8. A device according to claim 1 wherein following pivoting of said holding element to the unblocking position, said release element and said latch are movable to the unlocked position.

9. A device according to claim 1 wherein said latch and said holding element positively engage one another in the blocking position.

10. A device according to claim 9 wherein said latch has a recess with a catch flank, said holding element extending into said recess and engaging said catch flank in the blocking position.

11. A device according to claim 1 wherein a first sensor signals positioning of said latch in the locked position.

12. A device according to claim 11 wherein said first sensor comprises a safety switch wirelessly transmitting signals.

13. A device according to claim 11 wherein said first sensor comprises a read head and an actuator interacting with said read head, signal transmission between said read head and said actuator only occurring when said latch is in the locked position.

14. A device according to claim 13 wherein said actuator is a transponder.

15. A device according to claim 1 wherein a second sensor generates a signal when said holding element is in the blocking position.

16. A protection device for releasably maintaining a locked and closed state of a protected area, comprising:
a part movable between open and closed positions;
a latch movable between locked and unlocked positions for releasably locking the part in a closed state;
a holding element releasably coupled to said latch and movable between a blocking position blocking said latch in the locked position thereof and an unblocking position allowing said latch to move from the locked position thereof to the unlocked position thereof;
a release element neutralizing blocking of said latch and being pivotable relative to said latch;
a displacement element coupled to said release element and movable between positions causing pivoting of said release element; and
a first knob connected to said displacement element by a coupling device to cause actuation of said release element, said coupling device having a first lever hinged to a second lever at an articulation point, said first lever being nonrotatably connected to said first knob, said second lever being connected to said displacement element at a position spaced from said articulation point.

17. A protection device according to claim 16 wherein said release element comprises a dual-arm lever pivotable about an axis.

18. A protection device according to claim 17 wherein said dual-arm lever comprises a first arm neutralizing blocking of said latch during rotation of said dual-arm lever and a second arm receiving force causing pivoting of said dual-arm lever.

19. A protection device according to claim 16 wherein a second knob is coupled to said latch to move said latch into the locked position, said first and second knobs being rotatable about axes offset relative to one another.

20. A protection device according to claim 16 wherein said latch has a recess with a catch flank, said holding element extending into said recess and engaging said catch flank in the blocking position.

* * * * *